United States Patent
Uotani et al.

(10) Patent No.: US 10,145,438 B2
(45) Date of Patent: Dec. 4, 2018

(54) SHOCK ABSORBER

(71) Applicant: Showa Corporation, Gyoda-shi (JP)

(72) Inventors: Tadashi Uotani, Fukuroi (JP); Koji Tokunaga, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/434,633

(22) Filed: Feb. 16, 2017

(65) Prior Publication Data

US 2017/0284497 A1    Oct. 5, 2017

(30) Foreign Application Priority Data

Mar. 30, 2016 (JP) ................ 2016-069674

(51) Int. Cl.
| | |
|---|---|
| *F16F 9/18* | (2006.01) |
| *F16F 9/34* | (2006.01) |
| *B62K 25/28* | (2006.01) |
| *F16F 9/32* | (2006.01) |
| *F16F 9/06* | (2006.01) |

(52) U.S. Cl.
CPC .............. *F16F 9/34* (2013.01); *B62K 25/283* (2013.01); *F16F 9/185* (2013.01); *F16F 9/3257* (2013.01); *B62K 2201/04* (2013.01); *F16F 9/062* (2013.01)

(58) Field of Classification Search
CPC .. F16F 9/34; F16F 9/185; F16F 9/3257; F16F 9/466; F16F 9/062; B62K 25/283; B62K 2201/04
USPC .......................... 188/314, 315, 322.13, 322.2
See application file for complete search history.

(56) References Cited

U.S. PATENT DOCUMENTS

| | | | | |
|---|---|---|---|---|
| 4,153,237 A | * | 5/1979 | Supalla ................. | B60G 17/04 188/266.8 |
| 4,311,302 A | * | 1/1982 | Heyer ..................... | F16F 9/096 188/298 |
| 4,732,244 A | * | 3/1988 | Verkuylen .............. | F16F 9/446 137/493.8 |

(Continued)

FOREIGN PATENT DOCUMENTS

| | | |
|---|---|---|
| EP | 2270355 A | 1/2011 |
| EP | 2899110 A | 7/2015 |

(Continued)

OTHER PUBLICATIONS

Extended European Search Report dated Sep. 26, 2017 for the corresponding European Patent Application No. 17156861.1.

*Primary Examiner* — Thomas W Irvin
(74) *Attorney, Agent, or Firm* — Leason Ellis LLP

(57) ABSTRACT

One embodiment provides a shock absorber. The shock absorber includes a reservoir communication path through which a damping force generator and a reservoir communicate with each other, a compression-side communication path through which a piston-side oil chamber and the damping force generator communicate with each other, and a compression-side inlet port which is provided in the damping force generator and into which oil flows from the compression-side communication path and which has a compression-side valve that generates damping force. The cross-sectional area of the reservoir communication path is smaller than the cross-sectional area of the compression-side inlet port.

9 Claims, 9 Drawing Sheets

(56) References Cited

U.S. PATENT DOCUMENTS

| | | | | |
|---|---|---|---|---|
| 5,957,252 | A * | 9/1999 | Berthold | B60G 11/30 188/281 |
| 6,029,958 | A * | 2/2000 | Larsson | F16F 9/18 188/282.5 |
| 6,105,740 | A * | 8/2000 | Marzocchi | B60G 17/021 188/298 |
| 7,568,562 | B2 * | 8/2009 | Beck | F16F 9/092 188/313 |
| 8,857,580 | B2 * | 10/2014 | Marking | B60G 13/06 188/266.2 |
| 8,857,582 | B2 * | 10/2014 | Murakami | F16F 9/446 188/314 |
| 8,950,558 | B2 * | 2/2015 | Turner | F16F 9/067 188/267 |
| 9,228,630 | B2 * | 1/2016 | Coaplen | F16F 9/3257 |
| 9,279,470 | B2 * | 3/2016 | Ikeda | F16F 9/34 |
| 9,915,313 | B2 * | 3/2018 | Coaplen | F16F 9/44 |
| 2006/0054435 | A1 * | 3/2006 | Yamaguchi | F16F 9/065 188/314 |
| 2008/0257668 | A1 * | 10/2008 | Yamaguchi | F16F 9/3485 188/285 |
| 2011/0017559 | A1 * | 1/2011 | Sintorn | B60G 13/08 188/314 |
| 2016/0090147 | A1 * | 3/2016 | Awasa | B62K 25/283 267/64.24 |
| 2016/0096585 | A1 * | 4/2016 | Awasa | B60G 15/06 267/220 |
| 2016/0265614 | A1 * | 9/2016 | Ripa | F16F 9/512 |
| 2016/0288870 | A1 * | 10/2016 | Murakami | B62K 25/283 |
| 2016/0298713 | A1 * | 10/2016 | Mochizuki | F16F 9/096 |
| 2016/0319897 | A1 * | 11/2016 | Mochizuki | F16F 9/096 |
| 2017/0114856 | A1 * | 4/2017 | Yoshida | F16F 9/185 |
| 2017/0284498 | A1 * | 10/2017 | Tokunaga | F16F 9/348 |
| 2018/0080518 | A1 * | 3/2018 | Tsuji | F16F 9/34 |

FOREIGN PATENT DOCUMENTS

| | | |
|---|---|---|
| JP | 2010-101422 A | 5/2010 |
| JP | 2011-012806 A | 1/2011 |

* cited by examiner

SHOCK ABSORBER

CROSS-REFERENCE TO RELATED APPLICATION(S)

This application claims priority from Japanese Patent Application No. 2016-069674 filed on Mar. 30, 2016, the entire contents of which are incorporated herein by reference.

BACKGROUND

1. Field

The present invention relates to a shock absorber.

2. Description of the Related Art

A hydraulic shock absorber for motorcycles includes a cylinder provided in a case in which oil is sealed, a piston provided so as to be slidable in the cylinder, a rod connected to the piston so as to extend outside the cylinder, and a damping force generating unit that controls the flow of oil occurring when the piston slides in the cylinder, to generate damping force. Such a hydraulic shock absorber is provided between a vehicle body and a wheel of a motorcycle in a state in which the case is connected to the wheel side or the vehicle body side and the rod is connected to the vehicle body side or the wheel side.

JP-2011-012806-A discloses a configuration of a damping force generating unit which includes a compression-side valve provided in a compression-side passage through which oil flows when a piston moves to a compression side in a cylinder and an extension-side valve provided in an extension-side passage through which oil flows when the piston moves to an extension side in the cylinder. Here, the damping force generating unit communicates with a subtank that stores oil, on a downstream side of the compression-side valve and the extension-side valve.

In a hydraulic shock absorber having such a configuration, the piston slides in the cylinder of the case when the wheels move up and down in relation to the vehicle body during traveling of a motorcycle. When the piston moves to the compression side in the cylinder, oil compressed by the piston flows into the compression-side passage and the passage is narrowed by the compression-side valve of the damping force generating unit whereby damping force is generated. Moreover, when the piston moves to the extension side in the cylinder, oil flows into the extension-side passage and the passage is narrowed by the extension-side valve of the damping force generating unit whereby damping force is generated.

The compression-side valve and the extension-side valve of the damping force generating unit are formed by a piston body having a port into which oil flows from the compression-side passage or the extension-side passage, and a thin sheet-shaped valve provided on one surface side of the piston body to block the port. When oil flows from the compression-side passage or the extension-side passage into the port, the valve elastically deforms according to the pressure of the oil in a direction of being separated from the surface of the piston body and the oil passes through a gap between the valve and the piston body. The passage of the oil is narrowed by the gap between the valve and the piston body, and the damping force is generated as a result.

For example, in a motorcycle for competition such as motocross, when the motorcycle hits on the ground from a jumping state, the wheels are displaced at a high speed of 10 m/s, for example, in relation to the vehicle body. When a displacement at such a high speed is input to the shock absorber, the piston moves at a high speed in the cylinder. As a result, oil flows at a high flow speed in the cylinder, and a large passage resistance is generated in a portion in which damping force is not generated at a low flow speed (for example, a narrowed intermediate portion of the passage through which oil flows toward the gap between the valve and the valve body). As a result, damping force is generated in a portion other than the gap between the valve and the piston body in which damping force is to be generated, and the shock absorber cannot exhibit its original damping characteristics.

SUMMARY

One object of the present invention is to provide a shock absorber capable of reliably exhibiting its original damping characteristics even when oil flows at a high flow speed.

A shock absorber according to an aspect of the present invention includes: a cylinder which has an outer tube and an inner tube provided on an inner side of the outer tube in a radial direction at an interval from the outer tube, and in which oil is sealed; a piston rod of which one end is inserted into the cylinder and the other end is extended outside the cylinder; a piston which is connected to the one end of the piston rod and is provided in the inner tube so as to be slidable along a central axis direction of the inner tube, and which partitions an inner space of the inner tube into a rod-side oil chamber closer to the piston rod and a piston-side oil chamber on an opposite side to the piston rod; a damping force generating unit which controls the flow of the oil occurring when the piston slides in the inner tube according to a displacement of the piston rod, to generate damping force; and a reservoir that compensates the oil according to a change in advancement volume of the piston rod into the cylinder. The shock absorber further includes: a reservoir communication path through which the damping force generating unit and the reservoir communicate with each other; a compression-side communication path through which the piston-side oil chamber and the damping force generating unit communicate with each other; and a compression-side port which is provided in the damping force generating unit, into which the oil flows from the compression-side communication path, and which has a compression-side valve that generates the damping force. A cross-sectional area of the reservoir communication path is smaller than a cross-sectional area of the compression-side port.

As described above, by setting the cross-sectional area of the reservoir communication path to be smaller than the cross-sectional area of the compression-side port, oil does not easily flow into the reservoir when an excessive input acts during the compression-side operation. In this way, after the oil pushed by the piston flows from the piston-side oil chamber to the damping force generation unit through the compression-side communication path and damping force is generated in the compression-side port, the oil flows smoothly toward the cylinder-side oil chamber. As a result, the shock absorber can exhibit its original damping characteristics even when oil flows at a high flow speed.

According to the shock absorber as described above, it is possible to reliably exhibit its original damping characteristics even when oil flows at a high flow speed.

DESCRIPTION OF THE EMBODIMENTS

Hereinafter, an embodiment for implementing a shock absorber will be described with reference to the accompanying drawings. However, the present invention is not limited to this embodiment.

Figure 1:
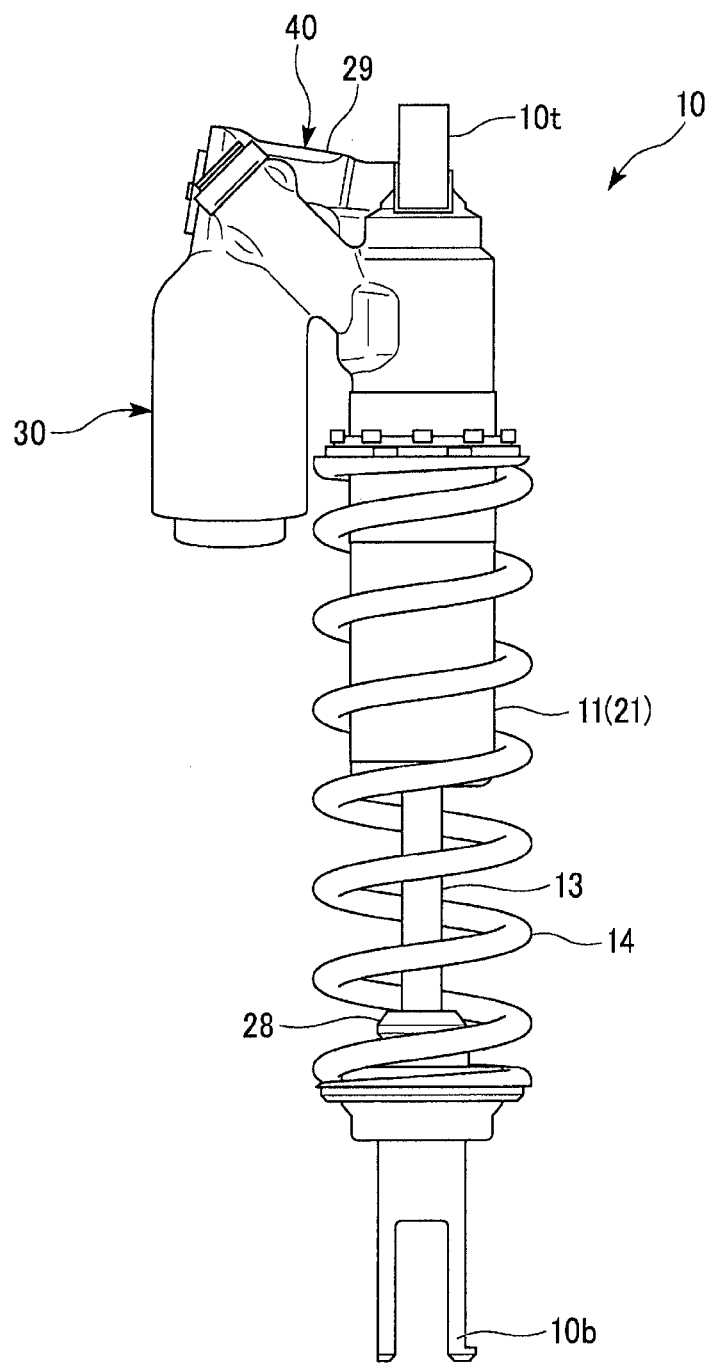
FIG. 1 is a front view illustrating an entire configuration of a shock absorber according to an embodiment.
Figure 2:
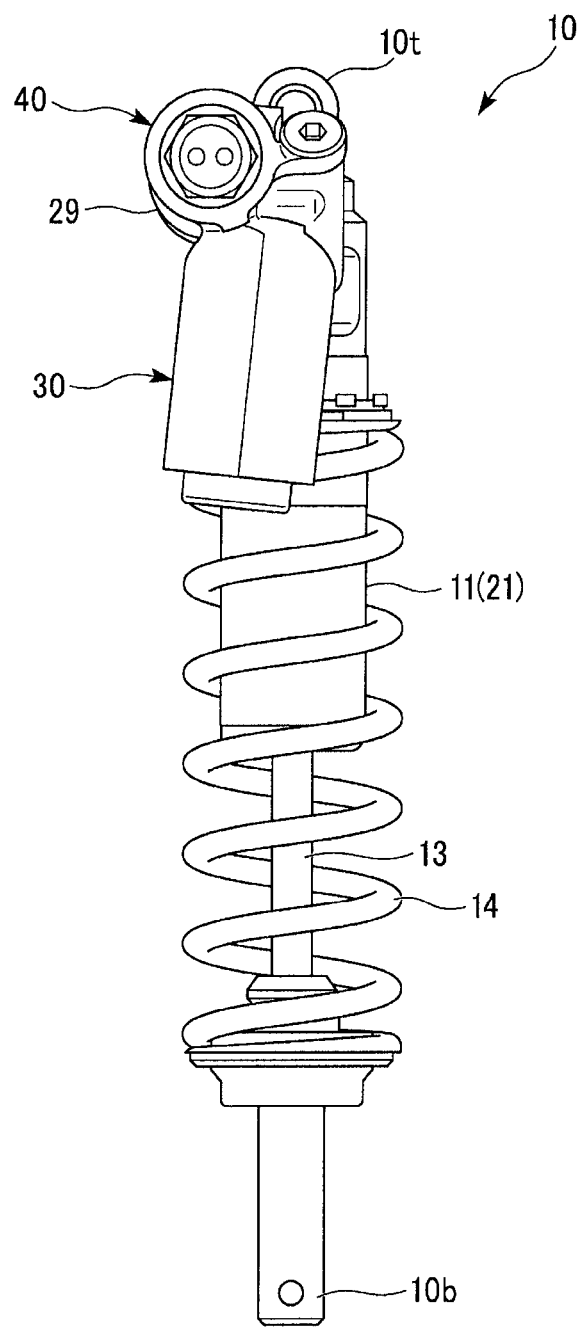
FIG. 2 is a side view of the shock absorber when seen from a different angle.
Figure 3:
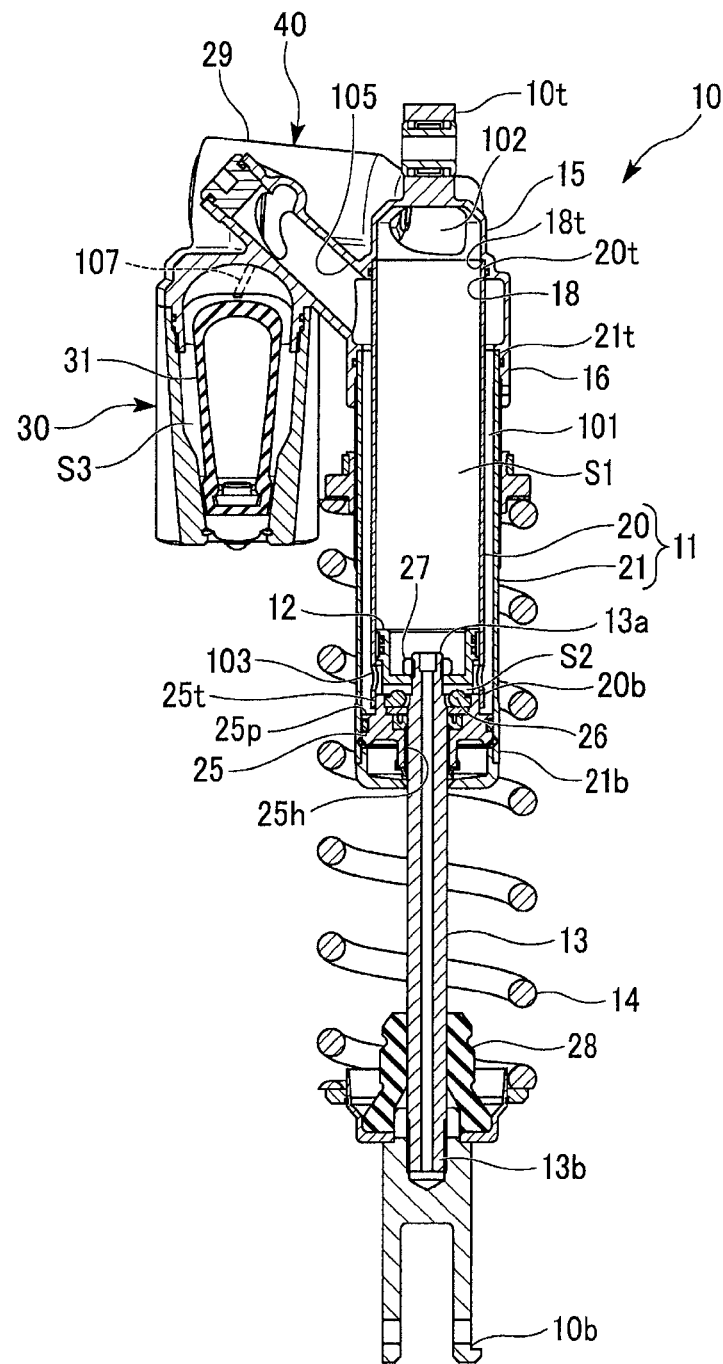
FIG. 3 is a cross-sectional view illustrating an entire configuration of the shock absorber.
Figure 4:
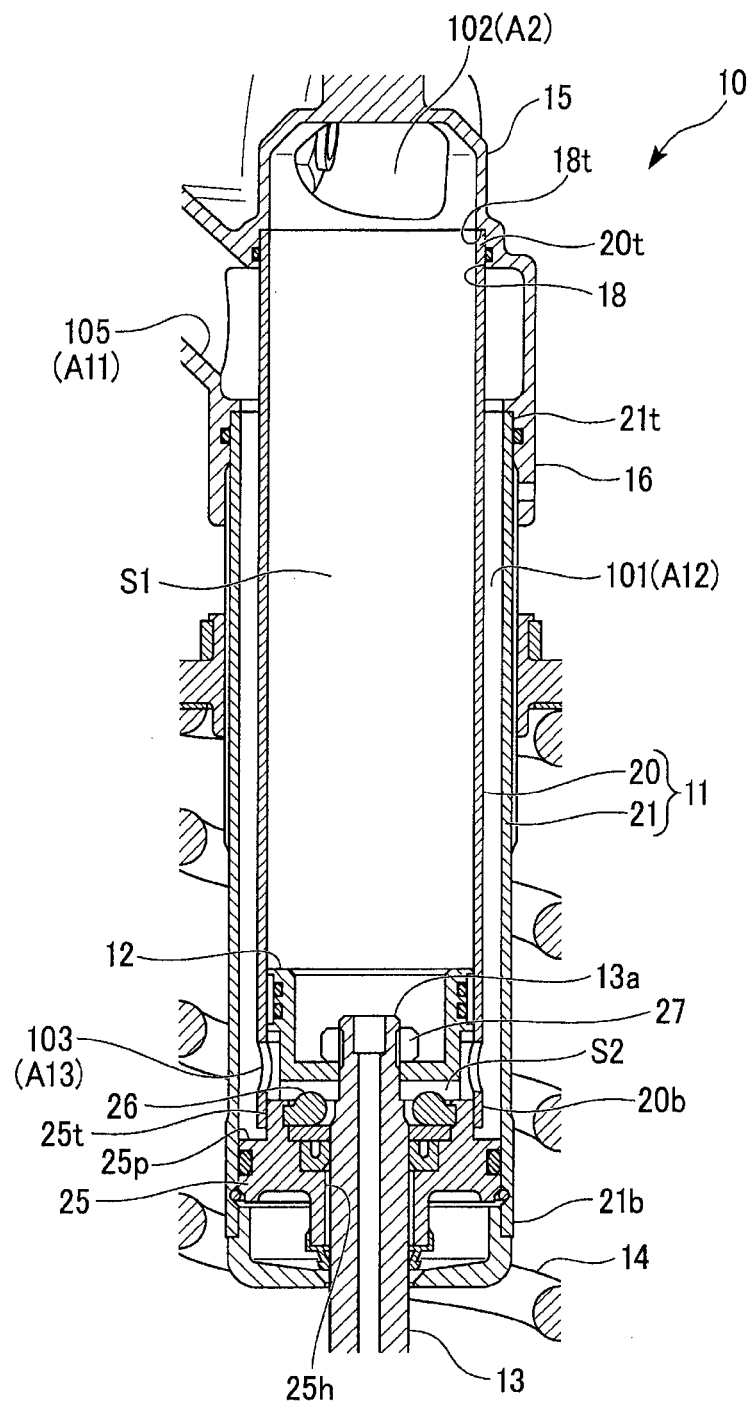
FIG. 4 is an enlarged cross-sectional view of the shock absorber illustrated in FIG. 3.

FIG. 1 is a front view illustrating an entire configuration of a shock absorber according to an embodiment. FIG. 2 is a side view of the shock absorber when seen from a different angle. FIG. 3 is a cross-sectional view illustrating an entire configuration of the shock absorber. FIG. 4 is an enlarged cross-sectional view of the shock absorber illustrated in FIG. 3.

(Shock Absorber)

As illustrated in FIGS. 1 to 3, a shock absorber 10 is provided between a vehicle body of a motorcycle and a rear wheel supporting portion that supports the rear wheel so as to absorb impact or vibration input from the rear wheel. In the following description, the shock absorber 10 extends in an up-down direction, for example, a vehicle body-side attachment member 10t provided at an upper end of the shock absorber 10 is connected to a vehicle body side, and a vehicle shaft-side attachment member 10b provided at a lower end of the shock absorber 10 is connected to a rear wheel side. However, the present invention does not exclude a case in which the shock absorber 10 is provided so as to extend in a lateral direction (approximately a horizontal direction), for example.

The shock absorber 10 includes a cylinder 11, a piston 12 (see FIG. 3), a piston rod 13, a reservoir 30, a damping force generator (a damping force generating unit) 40, and a spring 14.

As illustrated in FIGS. 3 and 4, the cylinder 11 includes an inner tube 20 and an outer tube 21 that form a concentric double-wall tube.

The outer diameter of the inner tube 20 is formed to be a predetermined size smaller than the inner diameter of the outer tube 21. In this way, a cylindrical annular passage 101 is formed between the inner tube 20 and the outer tube 21.

A damper case 15 in which the vehicle body-side attachment member 10t is provided is disposed on an upper end side of the shock absorber 10. A cylindrical cylinder holding portion 16 extending toward the cylinder 11 is provided in the damper case 15. The outer tube 21 is held in a state in which an upper end 21t of the outer tube 21 is inserted in the cylinder holding portion 16.

As illustrated in FIG. 4, the inner tube 20 is held in a state in which an upper end 20t of the inner tube 20 extends upward further than the upper end 21t of the outer tube 21 and is inserted into an inner tube holding recess 18 formed in the damper case 15. The inner tube holding recess 18 has such an inner diameter that the upper end 20t of the inner tube 20 is inserted in the inner tube holding recess 18. The inner tube holding recess 18 has an abutting surface 18t on which the upper end 20t of the inner tube 20 abuts and the inner tube holding recess 18 fixes the inner tube 20 in a state in which movement toward the upper side (toward the vehicle body-side attachment member 10t) of the inner tube 20 is restrained.

The outer tube 21 has the upper end 21t, positioned closer to the piston rod 13, which is disposed on the lower side of the upper end 20t of the inner tube 20.

Moreover, the outer tube 21 is formed so that the lower end 21b thereof protrudes downward further than the lower end 20b of the inner tube 20 to a predetermined extent.

A rod guide 25 is provided on the inner side of the lower end 21b of the outer tube 21. The rod guide 25 includes a plate portion 25p that makes contact with an inner circumferential surface of the outer tube 21 to block the inner side of the lower end 21b of the outer tube 21 and a tubular portion 25t that extends toward the damper case 15 from the upper surface of the plate portion 25p. The plate portion 25p and the tubular portion 25t are integrated with each other.

The tubular portion 25t of the rod guide 25 is inserted in the lower end 20b of the inner tube 20 to thereby hold the lower end 20b of the inner tube 20 so as to be immovable in a direction crossing the central axis thereof.

The plate portion 25p of the rod guide 25 blocks the annular passage 101 between the outer tube 21 and the lower end 20b of the inner tube 20.

Moreover, the rod guide 25 has an insertion hole 25h which passes through the plate portion 25p and the tubular portion 25t and through which the piston rod 13 is inserted so that the piston rod 13 is guided so as to be slidable in the central axis direction.

Furthermore, a rebound rubber 26, which absorbs the impact of the piston 12 colliding, is provided on the inner side of the tubular portion 25t of the rod guide 25.

The piston 12 is connected to an upper end (one end) 13a of the piston rod 13 by a nut 27. The piston 12 is provided on the inner side of the inner tube 20 of the cylinder 11 together with the piston rod 13 so as to be slidable along the central axis direction (the up-down direction) of the inner tube 20.

The piston 12 partitions the inner space of the inner tube 20 of the cylinder 11 into a piston-side oil chamber S1 formed closer to the damper case 15 on the opposite side to the piston rod 13 and a rod-side oil chamber S2 formed closer to the piston rod 13.

As illustrated in FIG. 3, the piston rod 13 of which the upper end 13a is connected to the piston 12 extends downward along the central axis direction of the inner tube 20, passes through the rod guide 25, and protrudes outside the cylinder 11. The vehicle shaft-side attachment member 10b is provided at the lower end 13b of the piston rod 13. A bump rubber 28 for preventing full compression of the shock absorber 10 is provided on the vehicle shaft-side attachment member 10b closer to the cylinder 11 in a state of being inserted in the piston rod 13.

A compression-side communication path 102 having one open end is formed in the damper case 15 at a position facing the opening of the upper end 20t of the inner tube 20. The compression-side communication path 102 allows the piston-side oil chamber S1 to communicate with a first oil chamber S11 (see FIG. 5) of the damping force generator 40 to be described later.

A plurality of oil holes 103 is formed in the lower end 20b of the inner tube 20 at intervals in the circumferential direction. Due to these oil holes 103, the rod-side oil chamber S2 and the annular passage 101 communicate with each other.

An extension-side communication path 105 having one open end is formed in the damper case 15 on the upper side of the upper end 21t of the outer tube 21. The extension-side communication path 105 allows the annular passage 101 to communicate with a third oil chamber S13 (see FIG. 5) of the damping force generator 40 to be described later.
(Reservoir)

A reservoir 30 is formed integrally with the damper case 15 and has a cylindrical form, for example, and a bag-shaped bladder 31 is provided therein. The bladder 31 is formed in a bag form using an elastic member such as rubber and can expand and contract. Gas such as air is filled in the bladder 31. A space on the outer side of the bladder 31 in the reservoir 30 is configured as an oil storage chamber S3 and communicates with a second oil chamber S12 (see FIG. 5) of the damping force generator 40 to be described later through a reservoir communication path 107.

Oil which is fluid is filled in the piston-side oil chamber S1 and the rod-side oil chamber S2 in the above-described cylinder 11, the annular passage 101 between the inner tube 20 and the outer tube 21, the oil storage chamber S3 in the reservoir 30, and the damping force generator 40 to be described later.
(Damping Force Generator)

Figure 5:
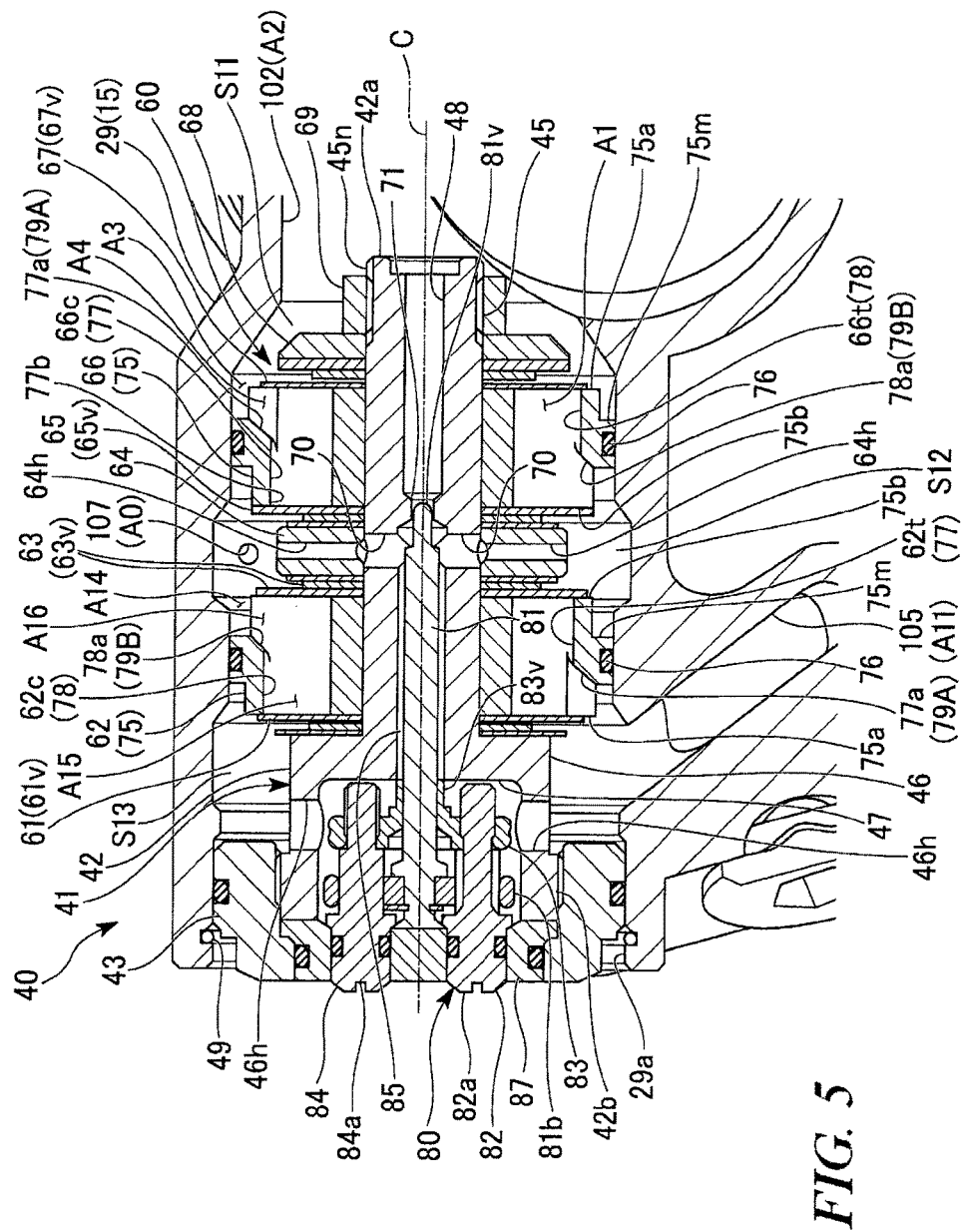
FIG. 5 is a cross-sectional view illustrating a damping force generator provided in the shock absorber.

FIG. 5 is a cross-sectional view illustrating the damping force generator provided in the damper case.

As illustrated in FIG. 5, the damping force generator 40 is configured so that a damper unit 41 is detachably attached to a damper cylinder 29 having a bottomed cylindrical form, formed integrally with the damper case 15.

The damper unit 41 generally has a columnar form and mainly includes a holder member 42, an outer cap 43, a main damper 60, and a damping adjustment portion 80.

The holder member 42 integrally has a shaft portion 45 formed in a predetermined length portion c closer to one end 42a and having a fixed outer diameter, and a large diameter portion 46 formed closer to the other end 42b and having a larger outer diameter than the shaft portion 45. A recess 47 depressed from the other end 42b side toward one end 42a side is formed in the large diameter portion 46. Furthermore, a central hole 48 that is open to one end 42a and the recess 47 is formed in the holder member 42 continuously in the direction of the central axis C of the shaft portion 45.

Moreover, a plurality of holes 46h through which the recess 47 on the inner side in the radial direction communicates with the outer side in the radial direction is formed in the large diameter portion 46 at intervals in the circumferential direction.

The outer cap 43 has a ring form is screwed and attached to the outer circumferential surface of the large diameter portion 46. The outer cap 43 is provided so as to block an opening 29a of the damper cylinder 29, and movement of the outer cap 43 in a direction of being removed from the damper cylinder 29 is restricted by a C-ring 49 attached to the inner circumferential surface of the opening 29a.

In the main damper 60, a compression-side outlet check valve 61, an extension-side piston 62, an extension-side damping valve 63, an intermediate member 64, a compression-side valve 65, a compression-side piston 66, an extension-side outlet check valve 67, and a stopper plate 68 are sequentially arranged from the large diameter portion 46 side of the holder member 42 to the one end 42a side thereof. The compression-side outlet check valve 61, the extension-side piston 62, the extension-side damping valve 63, the intermediate member 64, the compression-side valve 65, the compression-side piston 66, the extension-side outlet check valve 67, and the stopper plate 68 are formed in a ring form, and the shaft portion 45 of the holder member 42 is inserted through the central portion of these components.

A plurality of extension-side inlet ports (extension-side ports) 62t and a plurality of compression-side outlet ports 62c are alternately formed in the extension-side piston 62 along the circumferential direction. The extension-side inlet port 62t and the compression-side outlet port 62c are formed so as to pass through the extension-side piston 62 in the direction of the central axis C.

The extension-side damping valve 63 is provided so as to block an outlet of the extension-side inlet port 62t closer to the intermediate member 64. The extension-side damping valve 63 is formed by stacking a plurality of disc valves 63v.

The compression-side outlet check valve 61 is formed of a disc valve 61v and is provided so as to block an outlet of the compression-side outlet port 62c closer to the large diameter portion 46.

A plurality of compression-side inlet ports (compression-side ports) 66c and a plurality of extension-side outlet ports 66t are alternately formed in the compression-side piston 66 along the circumferential direction. The compression-side inlet port 66c and the extension-side outlet port 66t are formed so as to pass through the compression-side piston 66 in the direction of the central axis C.

The compression-side valve 65 is provided so as to block an outlet of the compression-side inlet port 66c closer to the intermediate member 64. The compression-side valve 65 is formed by stacking a plurality of disc valves 65v.

The extension-side outlet check valve 67 is formed of a disc valve 67v and is provided so as to block an outlet of the extension-side outlet port 66t closer to the stopper plate 68.

The intermediate member 64 is disposed between the extension-side damping valve 63 and the compression-side valve 65. A plurality of passages 64h through which the inner side in the radial direction communicates with the outer side in the radial direction is formed in the intermediate member 64 continuously in the radial direction at intervals in the circumferential direction. A passage 70 extending from the central hole 48 toward the outer side in the radial direction is formed in the shaft portion 45 of the holder member 42 at a position communicating with the respective passages 64h of the intermediate member 64.

The extension-side damping valve 63 and the compression-side valve 65 are configured to block the compression-side inlet port 66c and the extension-side inlet port 62t to block the flow of oil at normal times. The extension-side damping valve 63 and the compression-side valve 65 are bent according to the pressure of oil passing through the compression-side inlet port 66c and the extension-side inlet port 62t and generate damping force when oil passes through the gap between the compression-side inlet port 66c and the extension-side inlet port 62t. The extension-side damping valve 63 and the compression-side valve 65 adjust the generated damping force by adjusting the number of disc valves 63v and 65v.

The compression-side outlet check valve 61 and the extension-side outlet check valve 67 block the flow of oil by blocking the compression-side outlet port 62c and the extension-side outlet port 66t at normal times and are bent according to the pressure of the oil passing through the compression-side outlet port 62*c* and the extension-side outlet port 66*t* to circulate oil.

The stopper plate 68 is disposed closer to one end 42*a* of the shaft portion 45 of the holder member 42 in relation to the extension-side outlet check valve 67.

A nut member 69 is screwed to a screw groove 45*n* formed at one end 42*a* of the shaft portion 45, and the compression-side outlet check valve 61, the extension-side piston 62, the extension-side damping valve 63, the intermediate member 64, the compression-side valve 65, the compression-side piston 66, the extension-side outlet check valve 67, and the stopper plate 68 are sandwiched between the nut member 69 and the large diameter portion 46 of the holder member 42.

The damping adjustment portion 80 includes a compression-side adjustment valve 81, a compression-side adjuster 82, an extension-side adjustment valve 83, and an extension-side adjuster 84.

The compression-side adjustment valve 81 has a distal end inserted into the central hole 48 from the recess 47 formed in the large diameter portion 46 of the holder member 42, and has a base end (the other end 42*b*) coupled with a disc-shaped end piece 81*b* within the recess 47.

The compression-side adjustment valve 81 has an outer diameter smaller than the inner diameter of the central hole 48. Due to this, a gap passage 85 is formed between the inner circumferential surface of the central hole 48 and the outer circumferential surface of the compression-side adjustment valve 81. Moreover, the compression-side adjustment valve 81 has a valve portion 81*v* which is provided at a distal end (one end 42*a*) side and of which the outer diameter decreases gradually toward the distal end. A throttle portion 71 of which the inner diameter is narrowed is formed in the central hole 48 closer to one end 42*a* of the holder member 42 than the passage 70, and the valve portion 81*v* is inserted in the throttle portion 71.

The compression-side adjuster 82 is held on an inner cap 87 attached to the inner side of the outer cap 43 so as to be rotatable around the central axis. The compression-side adjuster 82 extends into the recess 47 and engages with the end piece 81*b*. A base portion 82*a* of the compression-side adjuster 82 is exposed to the outer side from the inner cap 87. In this way, when the compression-side adjuster 82 is rotated from the outer side of the damper case 15, the end piece 81*b* advances and retracts in the direction of the central axis C along the compression-side adjuster 82. By doing so, the valve portion 81*v* of the compression-side adjustment valve 81 advances and retracts in relation to the throttle portion 71 to increase and decrease the gap between the throttle portion 71 and the valve portion 81*v*.

The extension-side adjustment valve 83 includes a tubular valve portion 83*v* which is provided in the recess 47 so as to extend toward an opening closer to the recess 47 of the central hole 48. The valve portion 83*v* is integrated with the extension-side adjustment valve 83. The compression-side adjustment valve 81 is inserted into the extension-side adjustment valve 83.

The extension-side adjuster 84 is held on the inner cap 87 attached to the inner side of the outer cap 43 so as to be rotatable around the central axis. The extension-side adjuster 84 extends into the recess 47 and engages with the extension-side adjustment valve 83. A base portion 84*a* of the extension-side adjuster 84 is exposed to the outer side from the inner cap 87. In this way, when the extension-side adjuster 84 is rotated from the outer side of the damper case 15, the extension-side adjustment valve 83 advances and retracts in the direction of the central axis C. By doing so, the valve portion 83*v* of the extension-side adjustment valve 83 advances and retracts in relation to the opening of the central hole 48 to increase and decrease the gap between the valve portion 83*v* and the gap passage 85.

In the damping force generator 40 having the above-described configuration, the extension-side piston 62 and the compression-side piston 66 are formed of a piston member 75 to be described below.

Figure 6:
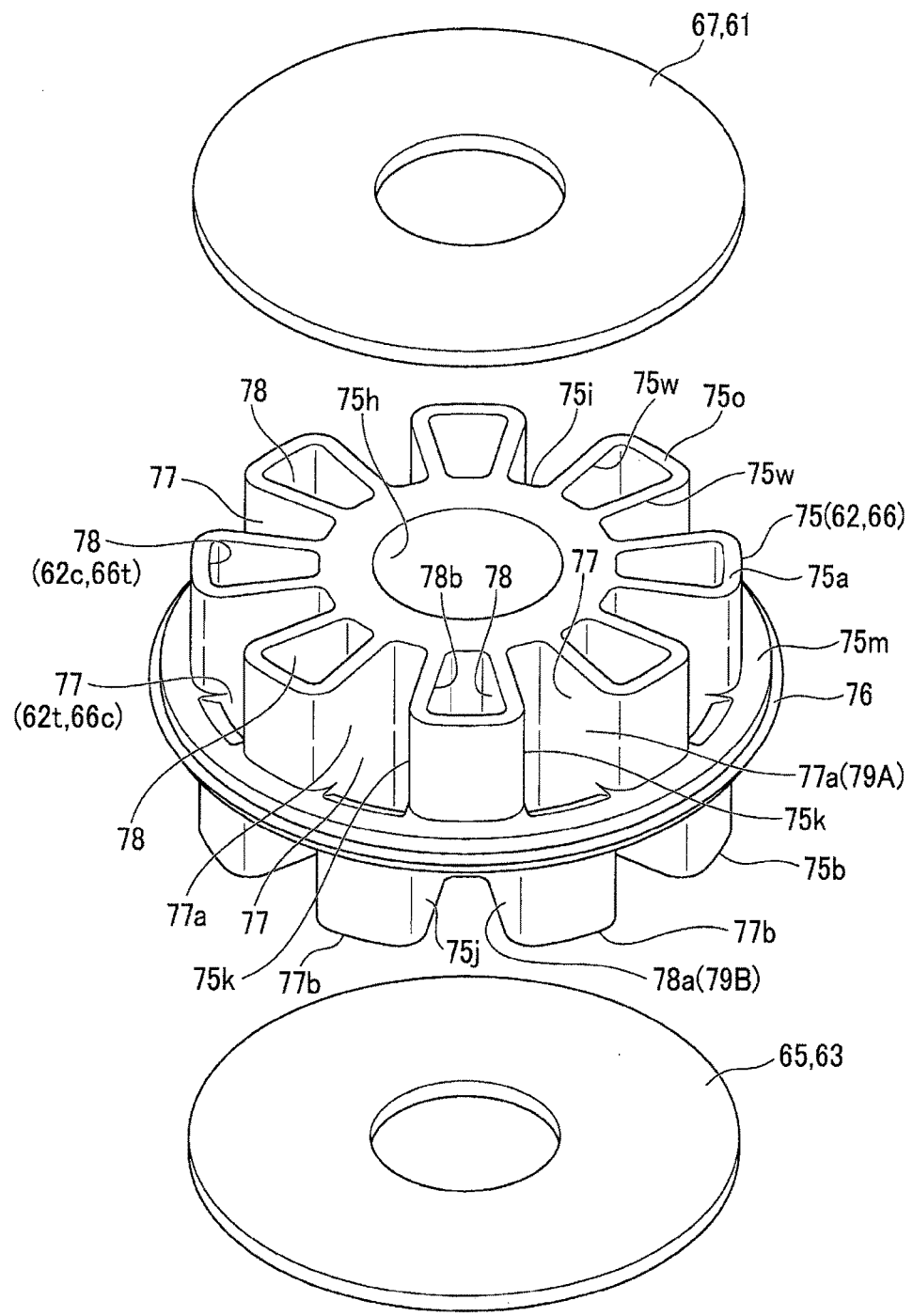
FIG. 6 is a perspective view illustrating a piston member that forms an extension-side piston and a compression-side piston.

FIG. 6 is a perspective view illustrating a piston member that forms the extension-side piston 62 and the compression-side piston 66.

As illustrated in FIG. 6, the piston member 75 integrally includes inner circumferential walls 75*i*, outer circumferential walls 75*o* formed on the outer side in the radial direction of the inner circumferential wall 75*i*, and a plurality of connection walls 75*w* formed at intervals in the circumferential direction so as to extend in the radial direction to connect the inner circumferential walls 75*i* and the outer circumferential walls 75*o*.

An insertion hole 75*h* in which the shaft portion 45 of the holder member 42 is inserted is formed on the inner side of the inner circumferential walls 75*i*.

A protruding wall 75*m* that protrudes toward the outer side in the radial direction is formed on the outer circumferential surface of the outer circumferential wall 75*o* continuously in the circumferential direction. A sealing ring 76 that abuts on the inner circumferential surface of the damper cylinder 29 to seal the space between the piston member 75 and the inner circumferential surface of the damper cylinder 29 is provided on the outer circumferential surface of the protruding wall 75*m*.

A first port 77 and a second port 78 are alternately formed in the piston member 75 along the circumferential direction between the inner circumferential wall 75*i* and the outer circumferential wall 75*o*. The first and second ports 77 and 78 are formed between the connection walls 75*w*, adjacent to each other in the circumferential direction. The first and second ports 77 and 78 pass in the direction of connecting one end 75*a* of the piston member 75 and the other end 75*b*. For example, the first port 77 forms the extension-side inlet port 62*t* or the compression-side inlet port 66*c*, and the second port 78 forms the compression-side outlet port 62*c* or the extension-side outlet port 66*t*.

The first port 77 has a port inlet 77*a* provided closer to one end 75*a* and a port outlet 77*b* provided closer to the other end 75*b*. A notch 75*k* is formed in the outer circumferential wall 75*o* on the side closer to one end 75*a* whereby a port inlet opening (a compression-side port inlet portion) 79A that is open to the outer side in the radial direction is formed in the first port 77.

The second port 78 has a port inlet 78*a* provided closer to the other end 75*b* and a port outlet 78*b* provided closer to one end 75*a*. A notch 75*j* is formed in the outer circumferential wall 75*o* on the side closer to the other end 75*b* whereby a port inlet opening (a compression-side outlet port inlet portion) 79B that is open to the outer side in the radial direction is formed in the second port 78.

As illustrated in FIG. 5, in the damping force generator 40 described above, the inner space of the damper cylinder 29 is partitioned into the first oil chamber S11, the second oil chamber S12, and the third oil chamber S13 by the sealing ring 76 of the piston member 75 that forms the compression-side piston 66 and the sealing ring 76 of the piston member 75 that forms the extension-side piston 62.

The first oil chamber S11 is formed closer to one end 42*a* of the holder member 42 than the sealing ring 76 of the compression-side piston 66 and communicates with the piston-side oil chamber S1 (see FIG. 4) through the compression-side communication path 102.

The second oil chamber S12 is formed between the sealing ring 76 of the compression-side piston 66 and the sealing ring 76 of the extension-side piston 62 and communicates with the oil storage chamber S3 (see FIG. 4) of the reservoir 30 through the reservoir communication path 107.

The third oil chamber S13 is formed between the sealing ring 76 of the extension-side piston 62 and the outer cap 43 and communicates with the annular passage 101 (see FIG. 4) of the cylinder 11 through the extension-side communication path 105.

The central hole 48 formed in the holder member 42 is open to the inner space of the first oil chamber S11 at one end 42a of the holder member 42.

The passage 64h formed in the intermediate member 64 is open to the inner space of the second oil chamber S12.

Moreover, the hole 46h formed in the large diameter portion 46 of the holder member 42 is open to the inner space of the third oil chamber S13.

Figure 7:
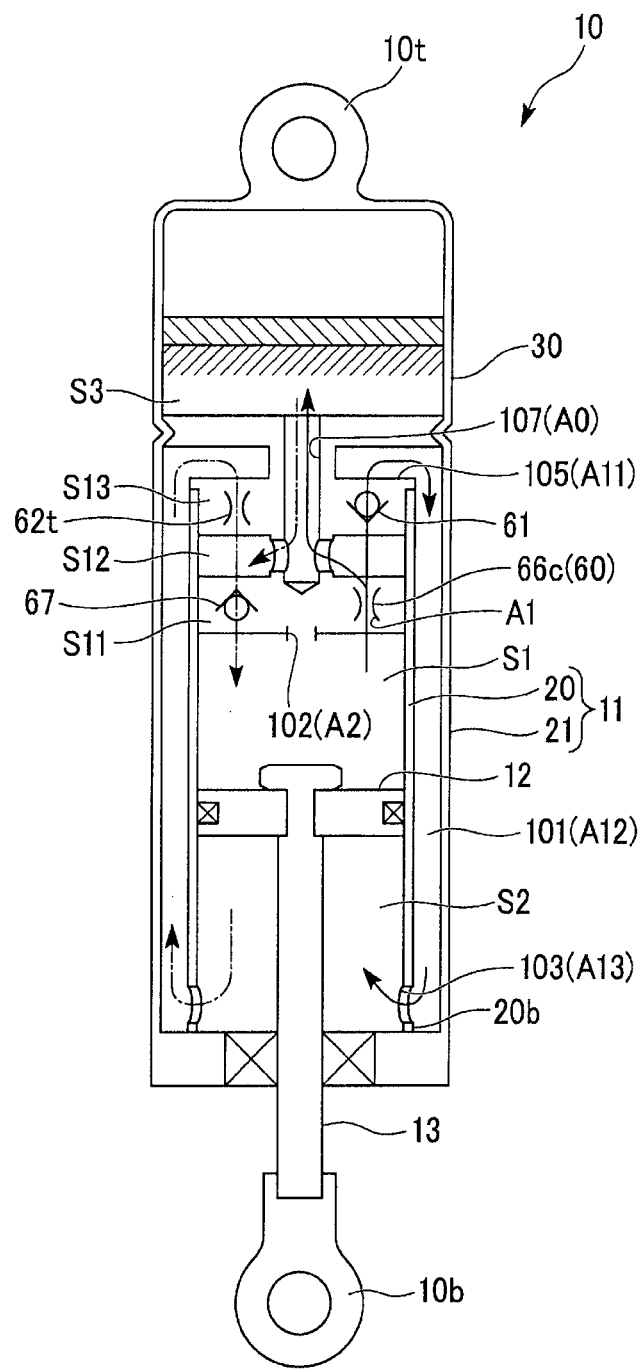
FIG. 7 is a diagram schematically illustrating a configuration of the shock absorber.

FIG. 7 is a diagram schematically illustrating the configuration of the shock absorber described above.
(Compression-side Operation)

As illustrated in FIGS. 5 and 7, in a compression-side cycle in which the piston 12 moves toward the vehicle body in the cylinder 11, oil in the piston-side oil chamber S1 is compressed by the piston 12. As a result, the oil in the piston-side oil chamber S1 is delivered into the first oil chamber S11 from the compression-side communication path 102 formed in the damper case 15.

The oil delivered to the first oil chamber S11 flows into the compression-side inlet port 66c from the port inlet opening 79A formed in the compression-side piston 66 of the main damper 60 to push and open the compression-side valve 65 provided on the outlet side of the compression-side inlet port 66c and flows toward the second oil chamber S12. In this case, the oil pushes and opens the compression-side valve 65 to pass through the gap between the compression-side valve 65 and the outlet of the compression-side inlet port 66c whereby damping force is generated.

A portion of the oil delivered to the first oil chamber S11 flows into the central hole 48 open to one end 42a of the holder member 42 to pass through the gap between the throttle portion 71 and the valve portion 81v of the compression-side adjustment valve 81 and flows into the second oil chamber S12 through the passage 70 formed in the shaft portion 45 and the passage 64h formed in the intermediate member 64. In this case, when a portion of the oil passes through the gap between the throttle portion 71 and the valve portion 81v of the compression-side adjustment valve 81, damping force is generated. Moreover, by allowing the compression-side adjustment valve 81 to advance and retract with the aid of the compression-side adjuster 82 to adjust the gap between the throttle portion 71 and the valve portion 81v of the compression-side adjustment valve 81, it is possible to adjust the damping force generated when the oil passes through the gap between the throttle portion 71 and the valve portion 81v of the compression-side adjustment valve 81.

A portion of the oil flowing into the second oil chamber S12 flows into the oil storage chamber S3 through the reservoir communication path 107 formed in the damper case 15 in order to compensate for a change in the volume of the piston rod 13 in the cylinder 11 according to the movement of the piston 12. Moreover, a remaining portion of the oil flowing into the second oil chamber S12 flows into the compression-side outlet port 62c from the port inlet opening 79B of the extension-side piston 62 to push and open the compression-side outlet check valve 61 and flows into the third oil chamber S13.

The oil flowing into the third oil chamber S13 flows into the rod-side oil chamber S2 through the extension-side communication path 105, the annular passage 101 of the cylinder 11, and the plurality of oil holes 103.
(Extension-side Cycle)

In an extension-side cycle in which the piston 12 moves toward the wheel in the cylinder 11 according to the upward and downward movement of the wheel, the oil in the rod-side oil chamber S2 is compressed by the piston 12. As a result, the oil in the rod-side oil chamber S2 flows toward the cylindrical annular passage 101 formed between the inner tube 20 and the outer tube 21 through the oil hole 103 formed in the lower end of the inner tube 20. The oil flowing through the annular passage 101 is delivered toward the third oil chamber S13 of the damping force generator 40 through the extension-side communication path 105 formed in the damper case 15.

The oil delivered to the third oil chamber S13 flows into the extension-side inlet port 62t from the port inlet opening 79A of the extension-side piston 62 to push and open the extension-side damping valve 63 provided on the outlet side of the extension-side inlet port 62t whereby damping force is generated. The oil having passed through the gap between the extension-side inlet port 62t and the extension-side damping valve 63 flows toward the second oil chamber S12.

A portion of the oil delivered to the third oil chamber S13 flows into the recess 47 from the hole 46h formed in the large diameter portion 46 of the holder member 42. Moreover, the oil passes through the gap between the gap passage 85 and the valve portion 83v of the extension-side adjustment valve 83 and flows into the second oil chamber S12 through the gap passage 85, the passage 70 formed in the shaft portion 45, and the passage 64h formed in the intermediate member 64. In this case, when a portion of the oil passes through the gap between the gap passage 85 and the valve portion 83v of the extension-side adjustment valve 83, damping force is generated. Moreover, by allowing the adjustment valve 83 to advance and retract with the aid of the extension-side adjuster 84 to adjust the gap between the gap passage 85 and the valve portion 83v of the extension-side adjustment valve 83, it is possible to adjust the damping force generated when the oil passes through the gap.

The oil flows from the oil storage chamber S3 into the second oil chamber S12 through the reservoir communication path 107 formed in the damper case 15 in order to compensate for a change in the volume of the piston rod 13 in the cylinder 11 according to the movement of the piston 12.

The oil having flowed into the second oil chamber S12 passes through the extension-side outlet port 66t from the port inlet opening 79B of the compression-side piston 66 to push and open the extension-side outlet check valve 67 and flows into the first oil chamber S11.

The oil in the first oil chamber S11 is delivered to the piston-side oil chamber S1 through the compression-side communication path 102 formed in the damper case 15.

In the present embodiment, the cross-sectional area A0 of the reservoir communication path 107 is smaller than the total cross-sectional area A1 of the plurality of compression-side inlet ports 66c having the compression-side valve 65 that generates damping force.

Moreover, the cross-sectional area A2 of the compression-side communication path 102 is equal to or larger than the cross-sectional area A1 of the compression-side inlet port 66c.

Furthermore, the cross-sectional area A3 between the compression-side piston 66 and the damper cylinder 29 into which the oil flows from the compression-side communication path 102 is equal to or larger than the total cross-sectional area A1 of the compression-side inlet port 66c and is equal to or smaller than the cross-sectional area A2 of the compression-side communication path 102.

Moreover, a total opening area A4 of the plurality of port inlet openings 79A is larger than the total cross-sectional area A1 of the plurality of compression-side inlet ports 66c.

Due to this, a passage cross-sectional area of a compression-side oil passage system that extends from the piston-side oil chamber S1 to reach the second oil chamber S12 gradually decreases without increasing in the halfway of the passage. Furthermore, since the cross-sectional area A0 of the reservoir communication path 107 is smaller than the total cross-sectional area A1 of the plurality of compression-side inlet ports 66c, the cross-sectional area A0 of the reservoir communication path 107 is the smallest.

The cross-sectional area A11 of the extension-side communication path 105 is larger than the cross-sectional area A0 of the reservoir communication path 107.

Furthermore, as illustrated in FIG. 5, the cross-sectional area A14 between the damper cylinder 29 and the extension-side piston 62 is larger than the cross-sectional area A0 of the reservoir communication path 107.

Moreover, the total cross-sectional area A15 of the plurality of compression-side outlet ports 62c is equal to or larger than the cross-sectional area A14 between the damper cylinder 29 and the extension-side piston 62. Furthermore, the total opening area A16 of the plurality of port inlet openings 79B is equal to or larger than the total cross-sectional area A15 of the plurality of compression-side outlet ports 62c.

Furthermore, the cross-sectional area A12 of the annular passage 101 is equal to or larger than the cross-sectional area A11 of the extension-side communication path 105. Moreover, the total cross-sectional area A13 of the plurality of oil holes 103 is equal to or larger than the cross-sectional area A12 of the annular passage 101.

In this way, in the compression-side operation, the passage cross-sectional area of the oil passage system that passes through the second oil chamber S12 gradually increases without being narrowed in the halfway of the passage.

In the above description, the cross-sectional area A0 of the reservoir communication path 107, the total cross-sectional area A1 of the compression-side inlet port 66c, the cross-sectional area A2 of the compression-side communication path 102, the cross-sectional area A3 between the damper cylinder 29 and the compression-side piston 66, the total opening area A4 of the port inlet openings 79A, the cross-sectional area A11 of the extension-side communication path 105, the cross-sectional area A14 between the damper cylinder 29 and the extension-side piston 62, the total cross-sectional area A15 of the compression-side outlet ports 62c, and the total opening areas A16 of the port inlet openings 79B are the cross-sectional areas of the smallest-diameter portions of the passages.

In the shock absorber 10 of the present embodiment, by setting the cross-sectional area A0 of the reservoir communication path 107 to be smaller than the cross-sectional area A1 of the compression-side inlet port 66c, oil does not easily flow into the reservoir 30 when an excessive input acts during the compression-side operation. In this way, after oil flows from the piston-side oil chamber S1 to the damping force generator 40 through the compression-side communication path 102 and damping force is generated in the compression-side inlet port 66c, the oil flows smoothly toward the piston-side oil chamber S1. As a result, the shock absorber 10 can exhibit its original damping characteristics even when oil flows at a high flow speed, for example.

An oil passage system that extends from the piston-side oil chamber S1 to reach the second oil chamber S12 in the compression-side operation is configured so that the cross-sectional area A2 of the compression-side communication path 102, the cross-sectional area A3 between the damper cylinder 29 and the compression-side piston 66, the total opening areas A4 of the plurality of port inlet openings 79A, and the total cross-sectional area A1 of the plurality of compression-side inlet ports 66c satisfy the relation of $A2 \geq A3 \geq A4 \geq A1$. That is, the passage cross-sectional area of the compression-side oil passage system extending from the piston-side oil chamber S1 to reach the second oil chamber S12 gradually decreases without increasing in the halfway of the passage. Furthermore, since the cross-sectional area A0 of the reservoir communication path 107 is smaller than the total cross-sectional area A1 of the plurality of compression-side inlet ports 66c, the cross-sectional area A0 of the reservoir communication path 107 is the smallest.

In this way, by setting the passage cross-sectional area so as not to increase in the halfway of the flow of oil in the compression-side operation, it is possible to suppress a loss of a passage resistance. In this way, even when oil flows at a high flow speed of 10 m/s, for example, during traveling of motocross or the like, it is possible to prevent generation of damping force which is generated when negative pressure or the like is generated in a portion other than the portion between the compression-side inlet port 66c and the compression-side valve 65 in which the damping force is to be exhibited. Thus, the shock absorber 10 reliably exhibits its original damping performance.

Moreover, by avoiding formation of a portion in which a passage is narrowed and damping force is generated in a portion other than the portion between the compression-side inlet port 66c and the compression-side valve 65, when the number of compression-side valves 65 is changed so that the damping characteristics are changed in an opening/closing portion of the compression-side valve 65, a rider can easily detect the change in the damping characteristics.

An oil passage system that extends from the second oil chamber S12 to return to the cylinder-side oil chamber S2 in the compression-side operation is configured so that the cross-sectional area A0 of the reservoir communication path 107, the cross-sectional area A14 between the damper cylinder 29 and the extension-side piston 62, the total opening area A16 of the plurality of port inlet openings 79B, the total cross-sectional area A15 of the plurality of compression-side outlet ports 62c, the cross-sectional area A11 of the extension-side communication path 105, the cross-sectional area A12 of the annular passage 101, and the cross-sectional area A13 of the oil hole 103 satisfy the relation of $A0 \leq A14 \leq A16 \leq A15 \leq A11 \leq A12 \leq A13$.

In this way, in the compression-side operation, the cross-sectional area of the oil passage system that passes through the second oil chamber S12 gradually increases. Due to this, in the compression-side operation, the oil which has exhibited damping force in the compression-side inlet port 66c of the compression-side piston 66 does not easily flow into the reservoir communication path 107 and is smoothly discharged from the damper cylinder 29.

Figure 8:
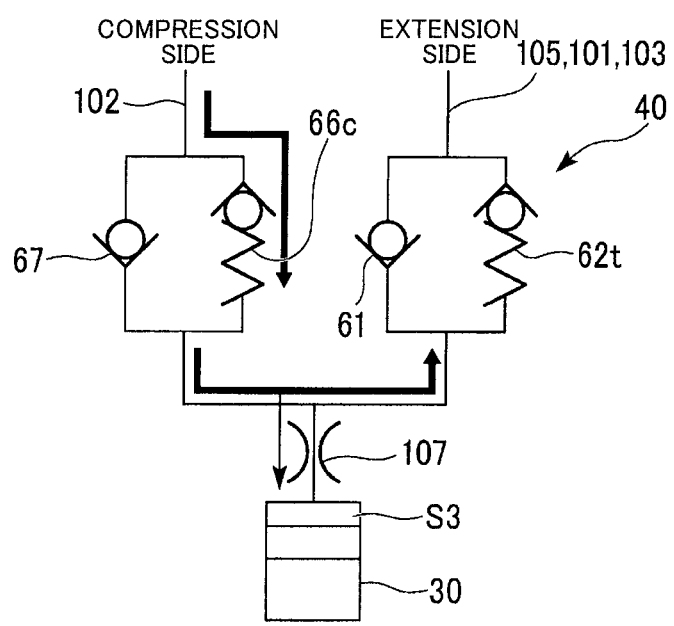
FIG. 8 is a diagram conceptually illustrating a flow speed distribution of oil when an excessive input acts on the shock absorber in a compression-side cycle and oil flows at a high speed.

FIG. 8 is a diagram conceptually illustrating an oil flow speed distribution when an excessive input acts on the shock absorber in a compression-side cycle and oil flows at a high speed. In FIG. 8, the thickness of an arrow indicates the flow speed of oil.

As illustrated in FIG. 8, by configuring the shock absorber 10 so that the cross-sectional area A0 of the reservoir communication path 107 is the smallest as described above, oil does not easily flow into the reservoir 30 when an excessive input acts during the compression-side operation. In this way, after oil flows from the piston-side oil chamber S1 into the damping force generator 40 through the compression-side communication path 102 and damping force is generated in the compression-side inlet port 66c, the oil smoothly flows toward the piston-side oil chamber S1 through an extension-side passage. As a result, the shock absorber 10 can exhibit its original damping characteristics even when oil flows at a high flow speed.

Figure 9:
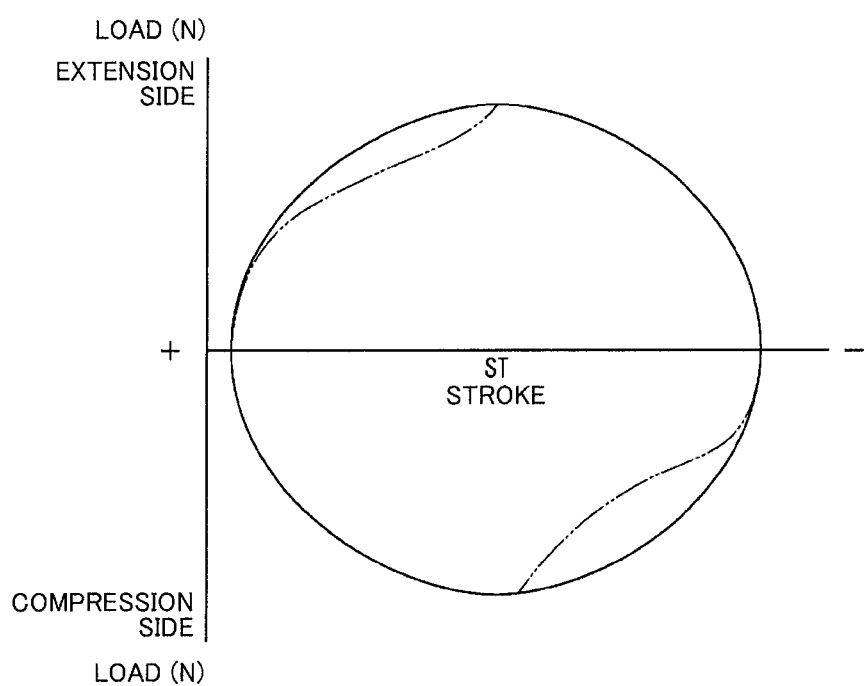
FIG. 9 is a diagram illustrating damping characteristics when an excessive input acts on the shock absorber in a compression-side cycle and oil flows at a high speed.

FIG. 9 is a diagram illustrating damping characteristics as the relation between stroke and load when an excessive input acts on the shock absorber in the compression-side cycle and oil flows at a high speed.

As illustrated in FIG. 9, in the conventional shock absorber which does not have the configuration of the present embodiment described above, the damping characteristics are distorted when the shock absorber operates at a high speed due to an excessive input as indicated by a two-dot chain line in FIG. 9. In contrast, according to the shock absorber 10 having the configuration of the present embodiment, even when the shock absorber operates at a high speed due to an excessive input, it is possible to suppress deformation of damping characteristics and to obtain satisfactory damping characteristics.

(Other Embodiments)

The shock absorber of the present invention is not limited to the embodiment described above with reference to the drawings, and various modifications may occur within the technical scope thereof.

For example, the configuration of the damping adjustment portion 80 provided in the damping force generator 40 is not particularly limited, and the damping adjustment portion 80 may be omitted.

Moreover, in the embodiment, although the extension-side piston 62 and the compression-side piston 66 are formed of the piston member 75, the present invention is not limited to this. Any one of the extension-side piston 62 and the compression-side piston 66 may be formed alone of the piston member 75. Moreover, the compression-side inlet port 66c only may include the port inlet opening 79A that is open to the outer side in the radial direction.

The entire configuration of the shock absorber 10 can be changed appropriately.

Beside this, the configurations described in the embodiment may be selected appropriately or changed to another configuration without departing from the gist of the present invention.

The invention claimed is:

1. A shock absorber comprising:
   a cylinder which has an outer tube and an inner tube provided on an inner side of the outer tube in a radial direction at an interval from the outer tube, and in which oil is sealed;
   a piston rod of which one end is inserted into the cylinder and the other end is extended outside the cylinder;
   a piston which is connected to the one end of the piston rod and is provided in the inner tube so as to be slidable along a central axis direction of the inner tube, and which partitions an inner space of the inner tube into a rod-side oil chamber closer to the piston rod and a piston-side oil chamber on an opposite side to the piston rod;
   a damping force generating unit which controls flow of the oil occurring when the piston slides in the inner tube according to a displacement of the piston rod, to generate damping force;
   a reservoir that compensates the oil according to a change in advancement volume of the piston rod into the cylinder;
   a reservoir communication path through which the damping force generating unit and the reservoir communicate with each other;
   a compression-side communication path through which the piston-side oil chamber and the damping force generating unit communicate with each other;
   an extension-side communication path through which the damping force generating unit and an annular passage formed between the outer tube and the inner tube communicate with each other; and
   a compression-side port which is provided in the damping force generating unit, into which the oil flows from the compression-side communication path, and which has a compression-side valve that generates the damping force,
   wherein a smallest cross-sectional area of the reservoir communication path is smaller than a smallest cross-sectional area of the compression-side port, and
   a smallest cross-sectional area of the extension-side communication path is larger than the smallest cross-sectional area of the reservoir communication path.

2. The shock absorber according to claim 1,
   wherein a smallest cross-sectional area of the compression-side communication path is equal to or larger than the smallest cross-sectional area of the compression-side port.

3. The shock absorber according to claim 1
   wherein the damping force generating unit includes:
   a compression-side piston having the compression-side port; and
   a damper cylinder that accommodates the compression-side piston, and
   wherein a smallest cross-sectional area between the compression-side piston and the damper cylinder into which the oil flows from the compression-side communication path is equal to or larger than the smallest cross-sectional area of the compression-side port and is equal to or smaller than the smallest cross-sectional area of the compression-side communication path.

4. The shock absorber according to claim 3,
   wherein a compression-side port inlet portion is formed in the compression-side piston on an inlet side of the compression-side port so as to be open to an outer circumferential surface of the compression-side side piston, and
   wherein an opening area of the compression-side port inlet portion is larger than the smallest cross-sectional area of the compression-side port.

5. The shock absorber according to claim 1,
   wherein a smallest cross-sectional area of the annular passage is equal to or larger than the smallest cross-sectional area of the extension-side communication path.

6. The shock absorber according to claim 1, further comprising:
an oil hole which is formed in the inner tube so as to allow communication between the annular passage and the rod-side oil chamber,
wherein a smallest cross-sectional area of the oil hole is equal to or larger than the smallest cross-sectional area of the annular passage.

7. The shock absorber according to claim 1,
wherein the damping force generating unit further includes:
an extension-side piston having an extension-side port into which the oil having flowed from the extension-side communication path into the damping force generating unit flows; and
a compression-side outlet port into which the oil having passed through the compression-side port of the compression-side piston flows,
wherein a smallest cross-sectional area between the damper cylinder and the extension-side piston is larger than the smallest cross-sectional area of the reservoir communication path.

8. The shock absorber according to claim 7,
wherein a smallest cross-sectional area of the compression-side outlet port is equal to or larger than the smallest cross-sectional area between the damper cylinder and the extension-side piston.

9. The shock absorber according to claim 7,
wherein a compression-side outlet port inlet portion is formed in the extension-side piston on an inlet side of the compression-side outlet port so as to be open to an outer circumferential surface of the extension-side piston, and
wherein an opening area of the compression-side outlet port inlet portion is larger than a smallest cross-sectional area of the compression-side outlet port.

* * * * *